Dec. 17, 1929.   C. E. HUNT   1,740,017

PIANO PEDAL EXTENSION

Filed March 20, 1929

INVENTOR
C. E. HUNT
BY
ATTORNEYS

Patented Dec. 17, 1929

1,740,017

UNITED STATES PATENT OFFICE

CLARENCE E. HUNT, OF MONTEREY PARK, CALIFORNIA

PIANO-PEDAL EXTENSION

Application filed March 20, 1929. Serial No. 348,450.

My invention relates to a pedal attachment for pianos, and has for an object the provision of a pedal extension device particularly adapted for use by children and other persons short of stature, to permit them to operate one or more pedals of a piano while playing, without the necessity of assuming an awkward and uncomfortable position.

A further object is the provision of a device of the general class described, which is practically instantaneously attachable to the piano in operative position, and removable therefrom.

A further object is the provision of a piano pedal operating device as described, which is provided with means for imposing a portion of the weight of the piano upon the device, so as to press the device firmly upon the floor or other supporting structure.

A still further object is the provision of a pedal operating device adapted to be pressed onto the floor by the piano itself, and yet which is so engaged with the piano, that it will not mar the finish thereof, in any manner.

A more detailed object is the provision of a pedal operating device which is adapted to be secured in operating position by pressing a locking bar upwards against the under side of one or more of the pedals which the operator does not contemplate using. In addition, this locking bar may be formed with a foot which may be engaged with the bottom of the front panel of the piano.

The invention possesses other objects and advantageous features, some of which, with those enumerated, will be set forth in the following description of the invention's particular embodiment which is illustrated in the drawings accompanying and forming a part of the specification.

Referring to the drawings.

Figure 1:
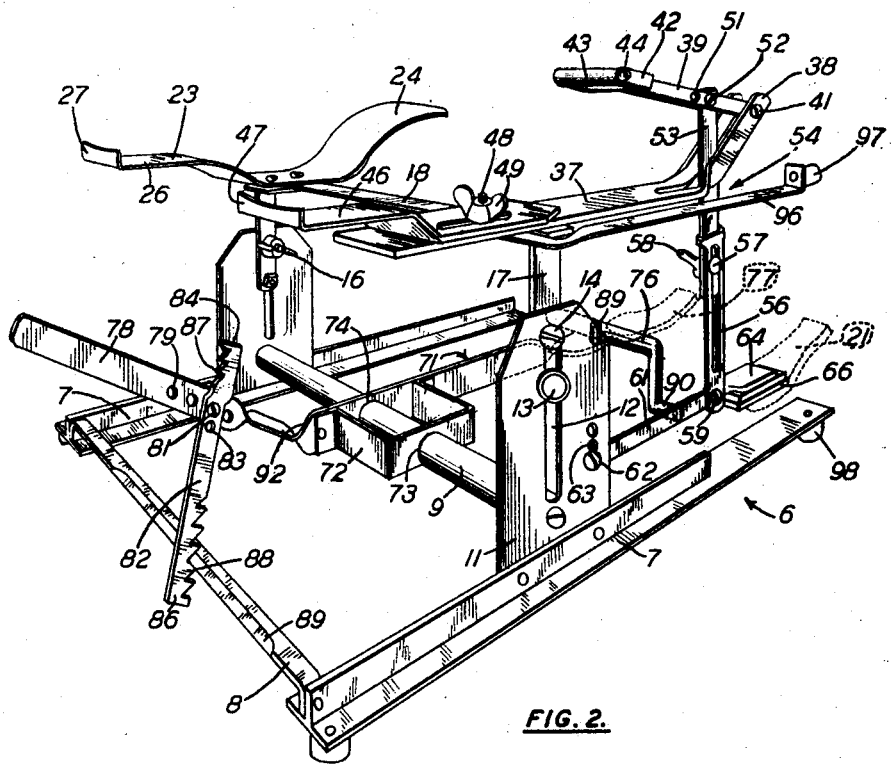
Figure 1 is a perspective view of a pedal operating device incorporating the principles of my invention.
Figure 2:
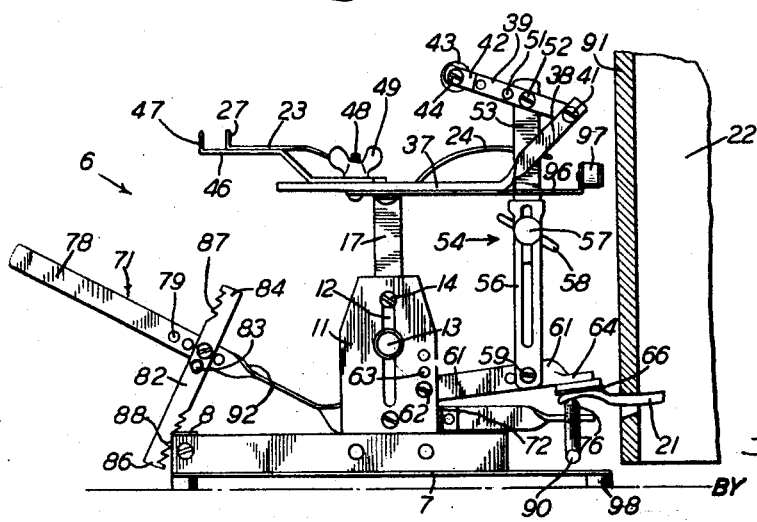
Fig. 2 is a side elevation of the pedal operating device of Fig. 1, and a vertical sectional view of a portion of a piano, and one of the pedals of which the device is adapted to operate.

While throughout the specification and claims, the device is spoken of as being a piano pedal operating mechanism, it should be understood that I do not wish to be limited to this use, as it is of equal utility for operating other pedals such as those of a reed organ and the like. With this understanding in view, I will proceed with the description of the preferred embodiment of my pedal operating device which comprises a frame indicated in its entirety at 6. This frame is composed of a pair of spaced and longitudinally extending base bars 7 joined at their after ends by a brace 8, and intermediate their ends, by a rod 9, which is made fast at each end to an upright 11, each of these uprights being riveted or otherwise securely attached to one of the base bars 7. Each of the uprights 11 is provided with an elongated, vertical slot 12, for the sliding reception of a pin 13 and a bolt 14, the latter of which is provided preferably with a wing nut 16. The pin 13, and bolt 14, associated with each upright 11, extend through one leg 17 of an inverted U-shaped pedal support 18, the effective height of which may be readily adjusted by loosening both wing nuts 16, which, by tightening, are adapted to firmly press the associated leg 17 of the U-shaped support 18, against the associated upright 11, to lock the support 18 in selected position.

Inasmuch as the instant modification of the invention, is designed with the object in view of operating only one pedal 21 of a piano 22, I have provided a stationary foot-rest 23, secured to the U-shaped support 18 adjacent one side thereof, this footrest having an elevated forward portion 24 upon which the sole of the shoe of the left foot may be supported, and another elevated portion 26 having a stop 27 for the heel of the same shoe.

A bracket 37 rigid with the other side of the support 18, extends forwards therefrom, having its forward end bifurcated and deflected upwards for the reception between the prongs 38 thereof, of an auxiliary pedal 39 which is pivotally connected to the prongs 38 as by a pin 41. This auxiliary pedal 39 extends rearwards from its point of suspension, and has its after end bifurcated for the reception between the prongs 42 thereof, of a roller 43 journalled upon any suitable type of pin 44. This roller 43 is adapted to be engaged by the sole of the right shoe of the operator, whereas the heel of that shoe, may rest upon an extensible support 46 having a stop 47, this support 46 being adjustably secured to the bracket 37, by a bolt 48 and wing nut 49 threaded thereon.

A plurality of holes 51 are provided in the auxiliary pedal 39, intermediate the roller 43 and the pivot pin 41. A pivot pin 52 may be disposed within any selected one of these apertures 51, to pivotally attach the upper member 53 of a link 54, to the auxiliary pedal 39. The lower member 56 of the link 54, is adjustably secured to the upper member 53, as by a bolt 57 having a wing nut 58 threaded thereon, and is pivotally attached as by a pin 59 to a pedal engaging lever 61. This lever 61 is pivoted as by a pin 62, to the adjacent upright 11, a plurality of holes 63 being provided in the upright for this purpose. The forward end 64 of the lever 61, is preferably provided with a pad 66, and is adapted to engage the top of the pedal 21, so that when the lever 61 is depressed in pivotal movement about the pin 62, the pedal 21 is also depressed.

Means are provided for rigidly mounting the entire device in operative position in respect to the pedal 21. A lever 71 is mounted for rotary movement upon the bar 9. Inasmuch as the lever 71 is preferably composed of a flat strip, a bracket 72 is riveted or otherwise attached to one side of the lever 71, this bracket having an aperture 73 in alignment with the aperture 74 in the lever 71, through which the bar 9 extends to provide an elongated journal for the lever. It should be observed that the rod 9 is of constant diameter throughout, permitting lateral adjustment of the lever 71, as well as rotational movement. The forward end of the lever 71 is provided with a locking bar 76 adapted to engage another pedal 77 of the piano 22, this bar 76 engaging its pedal 77 however, upon the under surface of that pedal. The after end 78 of the lever 71, is deflected upwards, and is provided with a plurality of holes 79, within any one of which a pivot pin 81 may be disposed to pivotally attach a ratchet bar 82 to the end 78 of the lever 71. The ratchet bar 82 is also preferably provided with a plurality of holes 83 for the reception of the pin 81; and these holes are spaced from the center of the bar 82, i. e., they are closer to one end 84 thereof than to the other end 86. Ratchet teeth 87 and 88 are provided on the locking bar 82, adjacent the ends 84 and 86 respectively, thereof, these teeth being disposed however, upon opposite edges. The brace 8 is provided with a beveled edge 89 with which any one of the teeth 87 or 88 may be releasably engaged.

Of course, the pedal cannot be used when the locking bar 76 is engaged therewith; and inasmuch as my invention contemplates the provision of auxiliary pedals for more than one of the piano pedals, it might be desirable to fasten the device in operative position in some manner other than by securing it to one of the piano pedals. Accordingly, I have mounted the locking bar 76 upon the lever 71, by means of a single rivet 89 or its equivalent, permitting rotation of the bar 76 into substantial parallelism with the lever 71. One end of the bar is deflected downwards, providing a foot 90 considerably lower than the main portion of the bar, so that this foot may be engaged with the bottom of the front panel 91 of the piano. The pressure of the bar upwards against the under side of the pedal 77, or panel 91, as the case might be, is made resilient by providing preferably a pair of twists 92 therein, between the point of attachment of the ratchet bar 82 and the locking bar 76.

A bumper 96 having a cushion or pad 97 on its forward end, is rigidly attached to the U-shaped support 18, and extends forward therefrom, so that the forward face of the pad 92, will engage the front surface 93 of the piano 22, should the entire pedal operating device be moved too far theretowards. Furthermore, a plurality of feet 98 composed of material having a relatively high coefficient of friction such as rubber, are secured to the under side of each base bar 7, adjacent each end thereof.

To properly position the pedal operating device in respect to a piano 22, to enable a child or other person of short stature, to easily operate the pedal 21, the entire pedal operating device should be disposed upon the floor in front of the piano 22, with the pad 66 of the lever 61, resting upon the top of that pedal 21. The lever 71 should then be adjusted both by sliding laterally and by pivotal movement upon the bar 9, to dispose the locking bar 76 under another pedal 77. The after end 78 of the lever 71, should then be pressed downwards, pressing the bar 76 upwards against the pedal 77, it being understood however, that upward movement of this pedal is prevented or restricted by the top of the slot in the front surface 91 of the piano 22, in which the pedal 77 is adapted to move. If it be desired to leave all the pedals of the piano free, the foot 90 should be disposed under the bottom edge of the front panel 91. If it should be found that the longer end 86 of the ratchet bar 82, engages the floor before the lever 71 can be moved to full locking position, the bar 82 may be reversed, so that the end 84 is lowermost, whereupon one of its teeth 87 may be engaged with the brace 8, to releasably hold the lever 71 with the bar 76 pressing firmly upwards against the pedal 77, or panel 91. This will result in imposing a portion of the weight of the piano 22, upon the frame 6; and inasmuch as the bar 9 upon which the lever 71 is supported, is disposed between the feet 98 upon which the frame is supported, this portion of the weight of the piano 22, thus imposed upon the frame 6, will increase the frictional engagement of all the feet 94, with the floor, tending to hold the entire device stationary with respect to the piano 22. However, should it eventuate that some unusually great force be exerted against the device to move it toward the piano 22, damage to the finish thereof will be prevented by the cushion 97 of the bumper 96.

After the pedal operating device has been so firmly secured in operating position, the effective length of the link 54, should be adjusted so as to dispose the auxiliary pedal 39 in most convenient position for the operator. It is obvious then, that when the operator presses as by the sole of the right foot, upon the roller 43, the pedal 21 will be depressed a distance proportional with the distance that the auxiliary pedal 39 is depressed. It should be here called to attention, that inasmuch as the auxiliary pedal 39 is pivoted adjacent its forward end, its motion under the foot of the operator, is substantially the same as that of the pedal 21. This is important, in that when the child has attained sufficient stature to permit him to dispense with the piano pedal operating device of the present invention, and to operate the pedal 21 directly, the motion of the pedal 21 under his foot at that time, will be substantially the same as that of the auxiliary pedal 39, with the result that it will feel the same as the pedal to which he has become accustomed to during training.

Inasmuch as a beginner, when he first learns to play the piano, will in all probability employ regularly, only one of the pedals, I have designed the present modification to operate but one pedal 21. However, it is obvious that another auxiliary pedal such as the auxiliary pedal 39, might be mounted upon the opposite side of the support 18 in the place of the stationary foot-rest 23, and have associated therewith another pedal operating lever such as the lever 61. However, in view of the fact that the construction of this other pedal operating mechanism, would be substantially the same as that described, I have not deemed it necessary to show and describe it in detail.

It is to be understood that the details of the invention as herein disclosed, are subject to alteration within the spirit or scope of the appended claims.

I claim:

1. A piano pedal operating device comprising a frame, a lever pivoted thereto in position to engage a piano pedal, an auxiliary pedal pivoted to said frame above said lever, a link joining said lever and auxiliary pedal, and means for pressing said frame upon its supporting structure to hold the frame stationary in respect to the piano.

2. A piano pedal operating device comprising a frame, a lever pivoted thereto in position to engage a piano pedal, an auxiliary pedal pivoted to said frame above said lever, a link joining said lever and auxiliary pedal, and means for pressing said frame upon its supporting structure to hold the frame stationary in respect to the piano, said pressing means operating on said frame in a line between the points of suspension thereof.

3. A piano pedal operating device comprising a frame, extension means carried by said frame for operating a pedal of a piano, and means for pressing said frame upon its supporting structure to hold the frame stationary with respect to the piano.

4. A piano pedal operating device comprising a frame, extension means carried by said frame for operating a pedal of a piano, and means for imposing a portion of the weight of said piano upon said frame, thereby pressing the frame upon its supporting structure to hold the frame stationary with respect to the piano.

5. A piano pedal operating device comprising a frame, extension means carried by said frame for operating a pedal of a piano, and means for imposing a portion of the weight of said piano upon said frame in a line between the points of support of the frame, thereby pressing the frame upon its supporting structure to hold the frame stationary with respect to the piano.

6. A piano pedal operating device comprising a frame, extension means carried by said frame for operating a pedal of a piano, friction feet supporting said frame, and means for imposing a portion of the weight of said piano upon said frame, thereby pressing the frame upon its supporting structure to hold the frame stationary with respect to the piano.

7. A piano pedal operating device comprising a frame, extension means carried by said frame for operating one of the pedals of a piano, and means for engaging another pedal to hold the frame stationary with respect to the piano.

8. A piano pedal operating device comprising a frame, extension means carried by said frame for operating one of the pedals of a piano, a locking bar, and means for pressing said bar upwards against the under side of another pedal to impose a portion of the weight of said piano upon said frame.

9. A piano pedal operating device comprising a frame, extension means carried by said frame for operating one of the pedals of a piano, a lever pivoted to said frame intermediate the points of support thereof, a locking bar carried by said lever in position to engage the under side of another pedal, and means for releasably locking said lever in selected position.

10. A piano pedal operating device comprising a frame, extension means carried by said frame for operating one of the pedals of a piano, a lever pivoted to said frame intermediate the points of support thereof, a locking bar carried by said lever in position to engage the under side of another pedal, a ratchet bar pivoted to said lever at a point spaced unequally from the ends of the bar, and ratchet teeth adjacent each end of the bar and upon opposite edges thereof, said teeth being adapted to releasably engage a portion of said frame.

11. A piano pedal operating device comprising a frame, a pedal operating lever pivoted thereto, means for securing said frame with said lever engaging a piano pedal, an auxiliary pedal pivoted on said frame, and means operably connecting said lever to said auxiliary pedal.

12. A piano pedal operating device comprising a frame, a pedal operating lever pivoted thereto, means for securing said frame with said lever engaging a piano pedal, a bracket rigid with said frame and extending forwards therefrom, an auxiliary pedal pivoted adjacent the forward end of said bracket and extending rearwards therefrom, and a link connecting said lever and auxiliary pedal.

13. A piano pedal operating device comprising a frame, a pedal operating lever pivoted thereto, means for securing said frame with said lever engaging a piano pedal, a bracket rigid with said frame and extending forwards therefrom, means for vertically adjusting said bracket, an auxiliary pedal pivoted adjacent the forward end of said bracket and extending rearwards therefrom, and an adjustable link connecting said lever and auxiliary pedal.

14. A piano pedal operating device comprising a frame, a pedal operating lever pivoted thereto, means for securing said frame with said lever engaging a piano pedal, a bracket rigid with said frame and extending forwards therefrom, means for vertically adjusting said bracket, an auxiliary pedal pivoted adjacent the forward end of said bracket and extending rearwards therefrom, an adjustable link connecting said lever and auxiliary pedal, and an adjustable heel rest associated with said bracket.

15. A piano pedal operating device comprising a frame, a pedal operating lever pivoted thereto, means for securing said frame with said lever engaging a piano pedal, a bracket rigid with said frame and extending forwards therefrom, means for vertically adjusting said bracket, an auxiliary pedal pivoted adjacent the forward end of said bracket and extending rearwards therefrom, an adjustable link connecting said lever and auxiliary pedal, and a cushioned bumper rigid with and extending forwards from said frame to engage the front of said piano and limit the movement of said frame theretowards.

16. A piano pedal operating device comprising a frame, extension means carried by said frame for operating one of the pedals of a piano, a lever pivoted to said frame intermediate the points of support thereof, a locking bar carried by said lever in position to engage optionally the under side of another pedal, or the bottom of said piano, and means for releasably locking said lever in selected position.

17. A piano pedal operating device comprising a frame, extension means carried by said frame for operating one of the pedals of a piano, and means for resiliently engaging another pedal to hold the frame stationary with respect to the piano.

18. A piano pedal operating device comprising a frame, extension means carried by said frame for operating one of the pedals of the piano, and resilient means for engaging the bottom of said piano to resiliently impose a portion of the weight of the piano upon the device.

In testimony whereof I have signed my name to this specification.

CLARENCE E. HUNT.